United States Patent

Melamed

[15] 3,657,928

[45] Apr. 25, 1972

[54] ANGULAR VELOCITY AND ACCELERATION MEASURING APPARATUS

[72] Inventor: Louis Melamed, Hingham, Mass.

[73] Assignee: The United States of America as represented by the National Aeronautics and Space Administration

[22] Filed: June 11, 1970

[21] Appl. No.: 45,519

[52] U.S. Cl. ..............................73/515, 73/521, 350/160 R
[51] Int. Cl..........................................G01p 3/26, G01p 3/36
[58] Field of Search............350/160 LC; 73/521, 515, 516 R

[56] References Cited

OTHER PUBLICATIONS

" Apparatus for the Calibration of Shear Sensitive Liquid Crystals" by E. J. Klein et al. from The Review of Scientific Instruments, February, 1970 pages 238– 239.

*Primary Examiner*—James J. Gill
*Attorney*—N. T. Musial, G. E. Shoor and J. R. Manning

[57] ABSTRACT

Disclosed is a combined angular velocimeter and accelerometer formed by a film of cholesteric phase liquid crystalline material retained between rotary and stationary discs. Shear-stress exerted on the liquid crystalline film by movement of the rotary disc changes the initial uniform coloration into either differently colored bands or colorless bands that are observed through the transparent stationary disc. The radii of the colored or colorless rings are proportional to the rotation rate while the radial velocity of the band of rings is proportional to the angular acceleration.

9 Claims, 2 Drawing Figures

Patented April 25, 1972

3,657,928

INVENTOR:
LOUIS MELAMED,
BY Herbert E. Farmer
ATTORNEY

ANGULAR VELOCITY AND ACCELERATION MEASURING APPARATUS

ORIGIN OF THE INVENTION

The invention described herein was made by an employee of the United States Government and may be manufactured and used by or for the government for governmental purposes without the payment of any royalties thereon or therefor.

BACKGROUND OF THE INVENTION

The present invention relates generally to measurement devices and relates more specifically to visual indicator devices for measuring angular velocity and/or acceleration.

Known velocimeters and accelerometers typically rely on electro-mechanical effects to generate small electric currents proportional in value to sensed levels of angular acceleration or velocity. The generated currents are generally applied to voltmeters or ammeters that provide readout of the sensed conditions. Because of such factors as bearing failure and electrical burnouts, the life expectancy of these known measuring devices is limited. Also, many employ indicators such as moving pointers that can be damaged, for example, by handling or in response to velocity or acceleration inputs beyond the device's designed dynamic range.

The object of this invention, therefore, is to provide an improved device that accurately indicates measured values of angular velocity and acceleration while alleviating the problems noted above.

SUMMARY OF THE INVENTION

The angular velocimeters and accelerometers disclosed herein utilize as a fundamental component, an element made from particular organic materials commonly known as liquid crystals. Such materials display extraordinary changes in their optical properties when subjected to various types of electrical, thermal and mechanical input signals. Of particular interest for the present invention are certain types of cholesteric phase liquid crystalline materials that exhibit considerable color change when subjected to magnitudes of shear-stress above a given threshold level. The original color of the crystalline material returns in response to a reduction in the magnitude of applied shear-stress to below the given threshold level.

According to a featured embodiment of the invention, a film of cholesteric phase liquid crystalline material is sandwiched between a rotatable disc and a stationary disc whose rotation is inhibited by an appropriate base. A coupling shaft is provided for rotating the rotatable disc in response to the angular movement being measured. In response to the differential shear-stress forces induced in the liquid crystal film by the relative rotational movement between the stationary and rotating discs, concentric colored or colorless rings appear in the crystalline material. The rings appear at positions in the liquid crystalline film in which the shear threshold is exceeded. Since the shear rate generated at any position in the liquid crystalline film is dependent upon both its radial position and the rotation rate, the radii of the colored or colorless rings are proportional to the rotation rate of the rotating disc. In addition, the radial velocity of a given colored or colorless band is directly proportional to the angular acceleration of the rotating disc. Thus, both angular velocity and angular acceleration can be determined by observing the color changes induced in the liquid crystalline material by the rotating disc.

A featured embodiment of the above described invention utilizes a rotating disc contacting the liquid crystalline film and a transparent stationary disc with radially calibrated indicia that afford a direct readout of the rotating disc's rotational velocity. The stationary disc incorporates a curved surface that forms a reservoir for the liquid crystal material when a variable thickness film is desired, or, a plane surface when a uniform thickness film is desired. The viscosity of the material prevents its loss from between the two discs. In some cases, a low friction ring spacer may be used between the discs to maintain a fixed separation. As an additional feature, the rotating disc's surface in contact with the liquid crystalline film is blackened to furnish a good contrast for the changing color rings produced.

DESCRIPTION OF THE DRAWINGS

These and other objects and features of the invention will become more apparent upon a perusal of the following description taken in conjunction with the accompanying drawings wherein.

DESCRIPTION OF THE PREFERRED EMBODIMENT

Figure 1:
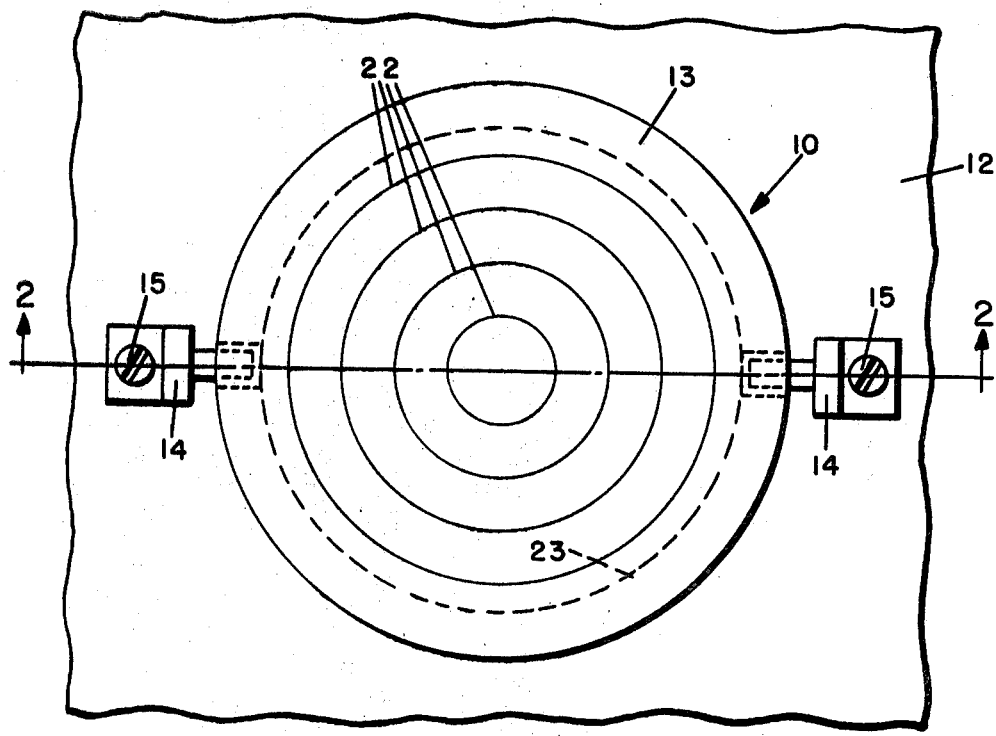
FIG. 1 is a plan view of a preferred measurement device embodiment of the invention.
Figure 2:
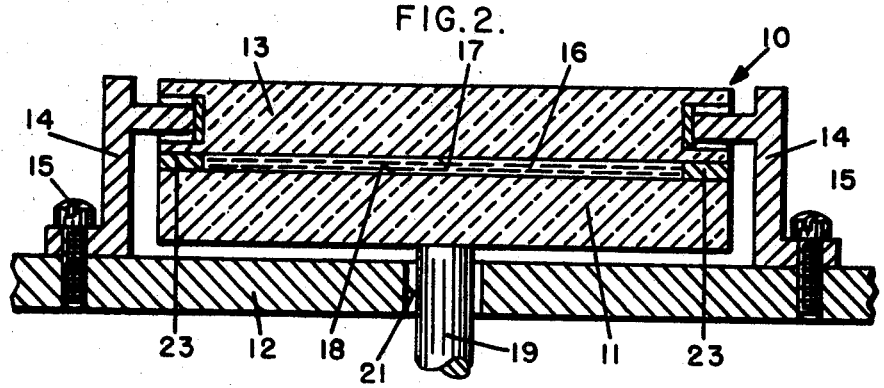
FIG. 2 is a cross-sectional view of the embodiment shown in FIG. 1 taken along lines 2—2.

Shown in the FIGURES is a velocimeter/accelerometer 10 including a circular disc 11 mounted above a base 12. Also disposed above the base 12 concentric with the rotatable disc 11 is a stationary but floating circular disc 13. The disc 11 is preferably slightly separated from the base 12 as shown and is restricted to rotation in its own plane by the viscous frictional forces of a liquid crystal film 16 between it and the stationary disc 13. Restraining the stationary disc 13 from rotating are support brackets 14 with projecting pins fixed to the base 12 by screws 15. Separating the plane parallel surfaces of the discs 11 and 13 is an annular spacer 23 made of, for example, Teflon. The cholesteric phase liquid-crystalline material 16 retained in the reservoir formed between the rotatable disc 11 and the stationary disc 13 can comprise, for example, 30 percent cholesteryl chloride, 28 percent cholesteryl nonanoate, and 42 percent cholesteryl oleyl carbonate.

The stationary disc 13 is composed of a suitable transparent material such as glass and the rotatable disc 11 is composed of any suitable smooth material such as, but not restricted to, glass and has a blackened upper surface 18 in contact with the liquid crystalline film 16. Keyed for rotation with the disc 11 is a coupling shaft 19 that projects through a central aperture 21 in the base 12. A plurality of radially spaced indicia rings 22 are concentrically engraved on the top surface of the stationary disc 13 as shown in FIG. 1.

The device 10 is utilized by operatively coupling the shaft 19 for rotation with an object such as a vehicle transmission or machine tool (not shown) the angular velocity or acceleration of which is to be measured. Subsequent movement of the object produces synchronized rotation of both the shaft 19 and the disc 11. A shear-stress gradient is induced in the film 16 resulting from the frictional and viscous forces it experiences between the stationary disc 13 and the rotating disc 11. In portions of the liquid-crystalline film 16 in which the induced shear exceeds some threshold value, color changes occur. Since the induced shear rates are uniform at given radii, the color changes assume a circular pattern and will typically comprise a series of multi-colored or colorless concentric rings. Both the shear threshold values required to induce color change and the individual colors produced are dependent upon the particular liquid-crystalline material which can be arbitrarily selected according to results desired. Descriptions of other cholesteric phase liquid-crystalline materials suitable for use in the invention and of the above-noted color change phenomenon appear in the following publications: Gray, G. W. "Molecular Structure and the Properties of Liquid Crystals," New York, Academic Press, 1962; and Brown, G. H. et al, "Liquid Crystals," New York Gordon and Breach Science Publishers, 1967.

The shear-stress forces exerted at any position in the liquid-crystalline film 16 are dependent upon both the radius of the position and on the rotational velocity of the disc 11 which is in turn determined by the rotational velocity of the object under test. Consequently, the radial positions in the liquid-crystalline film 16 at which color changes occur are proportional to the rotational velocity of the disc 11 and of the object under test. For example, at zero rotation, the entire liquid crystalline film 16 viewed through the transparent stationary disc 13 presents a uniform color which can be chosen anywhere in the visible spectrum by selection of a suitable crystalline material. In response to rotation of disc 11 however, a color change occurs at the outer periphery of the crystalline film 16 and the color change proceeds radially inward in response to increasing velocities of rotation. Thus, the radial position of any particular colored or colorless ring in the band of rings produced is proportional to the rotational velocity. By visually observing the radial position of a particular colored band relative to the engraved rings 22 on the transparent plate 13 which have been suitably calibrated and designated, a direct readout of rotational velocity is obtained.

If the disc 11 is experiencing rotational acceleration, the resultant varying induced shear-stress forces will be accompanied by changing widths in the colored or colorless bands. In this case, the average radius of the colored or colorless bands will change at a rate directly proportional to the rotational acceleration of the disc 11. Thus, a readout of measured rotational acceleration is obtained by either observing the changing width of the colored or colorless bands or by observing their radial velocity in the liquid-crystalline film 16.

The many advantages of the measurement device 10 will be obvious. Since the liquid-crystalline film 16.

The many advantages of the measurement device 10 will be obvious. Since the liquid-crystalline material 16 has sufficient viscosity to automatically maintain separation while also providing lubrication between the rotation disc 11 and the stationary disc 13, the requirement for bearings is eliminated. Consequently, the bearing failure problems typically associated with conventional velocimeters and accelerometers are obviated. Also, no electrical failure is possible since no power source is required to read out the velocity or acceleration of the device 10. Still other advantages of the device 10 are its capacity to accept velocity and acceleration inputs beyond its designed dynamic range without harm and to automatically return to its original condition after having its liquid crystalline properties destroyed by excessive temperatures. Another unique property of this device claimed is that the memory of the last rotational state is preserved when rotation is abruptly terminated. This memory is accomplished by the retention of the position and color of the last colored or colorless band. It will be automatically erased upon a new rotational input. However, the memory lasts for periods exceeding 8 hours in the absence of any input. If total erasure of the last rotational state is desired without a new rotational input, this may be accomplished by gentle heating and recooling to room temperature at which time the original uniform coloration is once more attained.

Obviously, many modifications and variations of the present invention are possible in light of the above teachings. For example, other structural configurations such as concentric cones or cylinders could be used to produce shear-stress in a retained film of liquid crystalline material. Also, in certain applications either one or both of the adjacent planar surfaces on the discs 11 and 13 can be replaced by concave surfaces. It is to be understood, therefore, that the invention can be practiced otherwise than as specifically described.

What is claimed is:

1. Angular movement measurement apparatus comprising:
   a. base means,
   b. a circular rotatable disc mounted for rotation on said base means,
   c. a circular stationary disc of transparent material spaced from said circular rotatable disc,
   d. support means restraining said stationary disc to said base means, and
   e. a disc of cholesteric phase liquid-crystalline material filling the space between said stationary and rotatable discs, said liquid-crystalline material contacting both said stationary and rotatable discs so as to be subjected to sheer stress in response to rotation of said rotatable disc, said liquid-crystalline material having a sheer stress threshold value which when exceeded causes said material to change color thereby indicating angular movement of said rotatable disc.

2. Angular movement measurement apparatus according to claim 1 including coupling means for coupling said rotatable element to an object, the angular motion of which is to be measured.

3. Angular movement measurement apparatus according to claim 1 wherein the adjacent surfaces of said stationary and rotatable discs are planar, and including an annular spacer between said planar surfaces forming a reservoir for said liquid-crystalline material.

4. Angular movement measurement apparatus according to claim 3 wherein one surface of said rotatable disc is darkened to provide a high contrast background for color changes in said liquid-crystalline material.

5. Angular movement measurement apparatus according to claim 1 including graduated measurement indicia disposed along a surface of said liquid-crystalline material.

6. Angular movement measurement apparatus according to claim 5 wherein said measurement indicia are disposed on a surface of said stationary disc.

7. Angular movement measurement apparatus according to claim 6 wherein said measurement indicia comprise concentric circles on said stationary disc.

8. Angular movement measurement apparatus according to claim 7 wherein the adjacent surfaces of said stationary and rotatable discs are planar, and including an annular spacer between said planar surfaces forming a reservoir for said liquid-crystalline material.

9. Angular movement measurement apparatus according to claim 8 wherein one surface of said rotatable disc is darkened to provide a high contrast background for color changes in said liquid-crystalline material.

* * * * *